M. B. Stafford.
Velocipede.
Nº 87,596.    Patented Mar. 9, 1869.

Witnesses.

P. T. Dodge
L. Hailer

Inventor:

M. B. Stafford
by Dodge & Munn
his attys

UNITED STATES PATENT OFFICE.

M. B. STAFFORD, OF NEW YORK, N. Y.

IMPROVEMENT IN VELOCIPEDES.

Specification forming part of Letters Patent No. 87,596, dated March 9, 1869.

*To all whom it may concern:*

Be it known that I, M. B. STAFFORD, of the city of New York, in the county of New York and State of New York, have invented certain new and useful Improvements in Velocipedes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to that class of velocipedes mounted on two wheels, and propelled by the feet of the rider striking the ground; and my invention consists in a novel construction and combination, with the main frame, of an adjustable seat and adjustable body-rest and a combined foot-rest and brake, all as hereinafter more fully explained.

Figure 1:
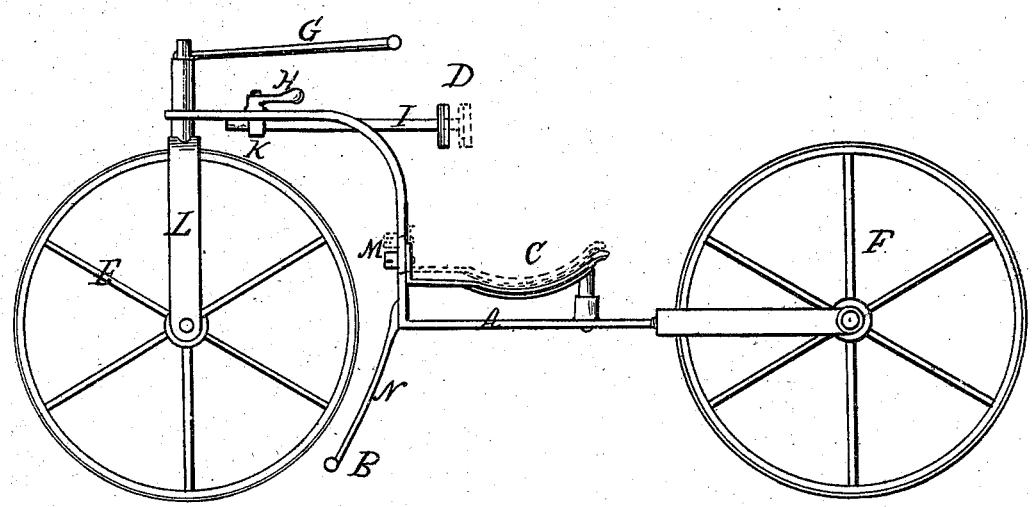
Figure 2:
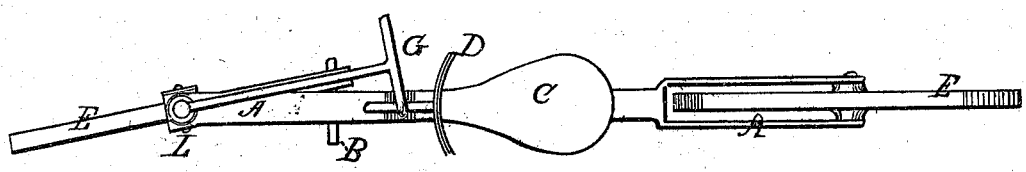

In the drawings, Figure 1 is a side elevation, and Fig. 2 a top-plan view.

In constructing my velocipede, I mount the front wheel, E, in the forked steering-post L, which has the tiller $a$ attached to its upper end. To the steering-post L, I connect the front end of the reach of frame A, so as to turn easily in the point of connection. The rear end of the frame A, I fork, and mount therein the wheel F, as shown in both figures.

Through the frame, and near its front end, I insert an eyebolt, K, having a screw-thread on its shank, with a hand-lever nut, H, for fastening it, as shown in Fig. 1, and in the eye of the bolt K, I insert the rod I, which passes through the curved part of the frame A, and has a rest, D, on its end, so as to be immediately in front of the rider, as shown in both figures.

To the vertical part of the frame A, immediately in the rear of the forward wheel E, I attach the seat C by means of a set-screw, M, which passes through a slot in the frame, and engages in the front end of the seat, as shown in Fig. 1; and also to the frame I connect rigidly an elastic rod, N, with the foot-rests B, so as to extend downward near the lower side of the front wheel, as shown in the same figure.

In operating my velocipede, I first adjust the seat C by means of the set-screw, as shown by the red lines, to suit the legs of the operator, and also the rest D by means of the eyebolt K and hand-lever nut H. This done, the operator mounts into the seat, and propels the velocipede with his feet touching the ground, as in walking or running.

When in rapid motion, or at other times, he can rest his feet upon the rests B, and, if he desires, can retard or arrest the motion of the velocipede by pressing this foot-rest against the wheel, in which case it serves as a brake. If weary, or tired of sitting erect, he can lean forward and rest himself against the adjustable rest D.

Having thus described my invention, what I claim is—

1. The combination, with the frame of a velocipede, of an adjustable body-rest, substantially as and for the purpose set forth.

2. The combined foot-rest and brake B, constructed and arranged to operate substantially as set forth.

3. The combination of adjustable rest D and the adjustable seat C with the frame of a velocipede, substantially as set forth.

M. B. STAFFORD.

Witnesses:
WM. G. AYERS,
E. PAGE DAVIS.